(12) United States Patent
Allexi et al.

(10) Patent No.: US 10,077,073 B2
(45) Date of Patent: Sep. 18, 2018

(54) METHOD AND APPARATUS FOR CONTROLLING A PARKING PROCESS OF A VEHICLE

(71) Applicant: Ford Global Technologies, LLC, Dearborn, MI (US)

(72) Inventors: Gregor Allexi, Köln (DE); Claudia Kunze, Köln (DE); Torsten Wey, Moers (DE); Mike John Mould, Leverkusen (DE); Stefan Kappes, Pulheim (DE); Mithat Ceylan, Langenfeld (DE)

(73) Assignee: Ford Global Technologies, LLC, Dearborn, MI (US)

( * ) Notice: Subject to any disclaimer, the term of this patent is extended or adjusted under 35 U.S.C. 154(b) by 117 days.

(21) Appl. No.: 14/063,200

(22) Filed: Oct. 25, 2013

(65) Prior Publication Data
US 2014/0121930 A1  May 1, 2014

(30) Foreign Application Priority Data
Oct. 26, 2012  (DE) .................. 10 2012 219 609

(51) Int. Cl.
*G05D 1/02* (2006.01)
*B62D 15/02* (2006.01)
(Continued)

(52) U.S. Cl.
CPC .......... *B62D 15/027* (2013.01); *B60W 10/06* (2013.01); *B60W 10/184* (2013.01);
(Continued)

(58) Field of Classification Search
None
See application file for complete search history.

(56) References Cited

U.S. PATENT DOCUMENTS

| 6,216,465 B1 * | 4/2001 | Wakashiro ............... B60K 6/48 |
| | | 180/65.25 |
| 2004/0113489 A1 * | 6/2004 | Iwagawa et al. ............. 303/155 |

(Continued)

FOREIGN PATENT DOCUMENTS

| DE | 19607788 A1 | 9/1997 |
| DE | 10030449 A1 | 1/2001 |

(Continued)

OTHER PUBLICATIONS

Translation of DE 102004044777 A1.*

*Primary Examiner* — Nicholas K Wiltey
(74) *Attorney, Agent, or Firm* — Burgess Law Office, PLLC; Frank A. MacKenzie

(57) ABSTRACT

A method and apparatus for controlling a parking process of a vehicle. The method including setting an upper speed limit; using a speed-limiting device to limit the speed of the vehicle at a parking speed that is less than or equal to the upper speed limit speed; suppressing an accelerator pedal speed increase request that increases the vehicle speed over the upper speed limit; and performing the assisted parking operation while limiting the vehicle speed and terminating the suppression of the increase in speed when the accelerator pedal is depressed by more than a predetermined value. Wherein the predetermined value is selected as a function of a slope on which the vehicle is located. The invention also relates to a steering system for an assisted parking procedure of a vehicle and a vehicle with such a steering system.

15 Claims, 4 Drawing Sheets

(51) Int. Cl.
*B60W 50/10* (2012.01)
*B60W 50/12* (2012.01)
*B60W 10/06* (2006.01)
*B60W 10/184* (2012.01)
*B60W 10/20* (2006.01)
*B60W 30/06* (2006.01)

(52) U.S. Cl.
CPC ............ *B60W 10/20* (2013.01); *B60W 30/06* (2013.01); *B60W 50/10* (2013.01); *B60W 50/12* (2013.01); *B60W 2720/10* (2013.01)

(56) References Cited

U.S. PATENT DOCUMENTS

| | | | | |
|---|---|---|---|---|
| 2007/0270281 | A1* | 11/2007 | Inoue et al. | 477/180 |
| 2007/0288145 | A1* | 12/2007 | Maeda et al. | 701/41 |
| 2012/0209488 | A1* | 8/2012 | Nagaya | B60W 50/087 701/70 |
| 2013/0041564 | A1* | 2/2013 | Doi | B60T 7/22 701/70 |
| 2013/0123066 | A1* | 5/2013 | Tomiie | B60W 50/087 477/185 |

FOREIGN PATENT DOCUMENTS

| | | | | |
|---|---|---|---|---|
| DE | 10337842 | A1 | 1/2005 | |
| DE | 102004044777 | A1* | 4/2006 | ............ B60T 7/22 |
| DE | 102008006054 | A1 | 7/2009 | |
| DE | 102010030486 | A1 | 12/2011 | |
| WO | WO2002084329 | A2 | 10/2002 | |
| WO | WO2003055734 | A1 | 7/2003 | |

* cited by examiner

METHOD AND APPARATUS FOR CONTROLLING A PARKING PROCESS OF A VEHICLE

CROSS-REFERENCE TO RELATED APPLICATIONS

Not Applicable.

BACKGROUND OF THE INVENTION

1. Field of the Invention

The present invention relates generally to a vehicle, and more particularly, to a method and apparatus for controlling a parking process of a vehicle.

2. Description of Related Art

Automotive vehicles may include various systems for aiding or assisting an operator of the vehicle. For example, assist systems have been developed and introduced by various automotive manufacturers to assist drivers in parking operations or other vehicle maneuvers. Such systems include APA (Active Park Assist), POA (Pull Out Assist), parking perpendicular to the direction of travel PPA (Perpendicular Park Assist) and parallel to the direction of travel SAPP (Semi Automated Parallel Parking).

Such systems often include ultrasonic sensors, an electric power steering system and a calculation unit. Based on the sensor signals, a parking curve is calculated and the vehicle is controlled independently in or out of a parking space. The gas and brake pedals remain under the influence or control of the driver. In addition, emergency braking systems are used to avoid hitting an obstacle.

Even though they are working correctly these systems sometimes do not behave like a driver expects. For example, the parking function is canceled when the driver accelerates the vehicle to a speed greater than 10 km/h. In a fully automatic system a driver may expect comfortable brake and throttle controls during an actual parking maneuver. If before ending a parking maneuver the vehicle approaches a parked vehicle at an excessive speed an ultrasonic parking aid may issue a warning that there is a risk of collision with the parked vehicle due to the excessive speed resulting in an emergency situation. In emergency situations occurring during parking maneuvers an automatic braking force brings the vehicle to hold and cancels the parking process. In such instances the brake activation is very sharp and is usually not expected by the driver.

SUMMARY OF THE INVENTION

Accordingly, an embodiment of the present invention provides a method for controlling an assisted parking procedure of a vehicle, including setting an upper speed limit; using a speed limiting device to limit the speed of the vehicle to a parking speed less than or equal to a preset or predetermined upper speed limit; suppressing any accelerator pedal request input from the operator of the vehicle that would increase the speed of the vehicle above the preset or predetermined upper speed limit; and carrying out the assisted parking procedure at the proper parking speed. The limiting speed and suppression of the increase in speed is terminated when the accelerator pedal is depressed by more than a predetermined value. With the predetermined value selected as a function of a slope on which the vehicle is located.

The vehicle speed of automatic or semi-automatic parking operation (parking and/or unparking) is not necessarily a fixed speed, but may vary from parking operation or during a parking process. The suppression of the acceleration or speed of the driver can be generated electrically, electronically and/or mechanically. The driver's request with the throttle will not be passed on to the engine or engine controller, as long as the accelerator is not depressed by more than the specified value.

The method allows a higher degree of automation with a higher success rate, as well as enabling assisted parking on sloping or sloped surface. In addition, the development cost and system cost are reduced in proportion to the degree of automation. Moreover, the method allows a reduction of the dynamic rate.

Parking maneuvers with good parking results follow a typical pattern. In addition to the pure control or steering of the vehicle, the speed of the vehicle must be within a certain range; that is, application of the rate/speed versus the distance or time results in a typical curve.

To allow the driver to follow this speed characteristic without braking autonomously or accelerating an algorithm is used to limit the speed.

A speed limiting device, also known as ASLD (adjustable speed limitation device), is commonly used in a forward mode and for higher speeds. However, they are not typically used for low parking speeds, below 10 km/h, and for back and forth or alternating forward and reverse travel. In addition, the speed limiter decouples or the input signal of the accelerator pedal; that is, it overrides the actual acceleration based on pedal movement, when the speed exceeds a defined value, for example, an upper speed limit.

The calculated path or route of the movement or the parking trajectory required steering angle and distance may use existing signals generated by, for example, radar or ultrasound. These signals can be used as input values for the limitation of the speed. This prevents the vehicle from travel faster than a defined or calculated speed for the calculated moving/parking path. Thus, a disruption of the parking maneuver or process based on excessive speed can be prevented. In addition, limiting the speed reduces the need for warnings to the driver to slow down and avoid disruption of the parking function. Other disruption warnings may still occur, but not because of excessive vehicle speed.

The limiting of the speed can be achieved by limiting the output or the rotational speed of an engine of the vehicle. Thus, achieving a more direct and convenient control of the vehicle than achieved using the brake.

In addition to limiting the speed of the vehicle, the vehicle brakes suitable for use in certain situations, particularly for very low speeds, to slow or stop the vehicle.

The speed limiting function can be overridden by the driver by continuing to depress the accelerator pedal; for example, the speed limiting function is overridden if the accelerator pedal is depressed/deflected more than a predetermined value or amount. This override function allows accelerations and velocities beyond the top or limited speed, thereby, as comfortably possible, canceling the assisted parking process. For example if, contrary to the original intention of the driver, an unforeseen event occurs that requires the driver to take control of the vehicle the driver depresses or deflects the accelerator pedal beyond the predetermined position and the upper speed limit limitation is released whereby the driver controls the speed of the vehicle. The predetermined position of the accelerator pedal at which the upper speed limit limitation is released is chosen according to a given gradient. In particular, the gradient can be selected for a first predetermined value for a first slope and a second predetermined value for a second slope. Preferably the predetermined value is selected depending on a linear gradient. The slope is interpreted relative to the current direction of travel. Thus, for example, if the vehicle is to be parallel parked on a slope, the predetermined value in the reverse gear will be greater than in forward gear as the vehicle must operate in reverse to the slope, and thus a greater deflection of the accelerator pedal is required.

At the end of the parking process, the speed of the vehicle can be continuously reduced up to a point wherein the engine holds the vehicle in position. Distance sensors and/or a route calculation of the parking process are or can be used to determine the stopping point of the vehicle. In addition, one or more signals from the distance sensors and/or route calculation are fed to the limiting device to reduce the speed in a slow and comfortable manner down to 0 km/h.

According to an additional embodiment of the invention a steering system for an assisted parking procedure of a vehicle includes a velocity or speed limiter limiting the speed of the vehicle during parking to a speed less than or equal to an upper speed limit. The speed limiter connects to an accelerator pedal of the vehicle and operates to suppress a request or input signal from the accelerator to increase the speed of the vehicle above the predetermined upper speed limit. The speed limiter and the unit for suppressing the input from the accelerator along with the components thereof or software routines therefore may be separate or combined as a unit.

A further embodiment of the invention relates to a vehicle having a steering system with, for example, having a processing unit and a control unit that can be implemented in one unit or as separate units with the processing unit controlling parking operation and the control unit controlling the vehicle speed. These components may also be part of an existing unit, such as a steering or vehicle control. In addition, the route calculation and setting of a top speed limit may utilize different hardware components and/or software controls.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
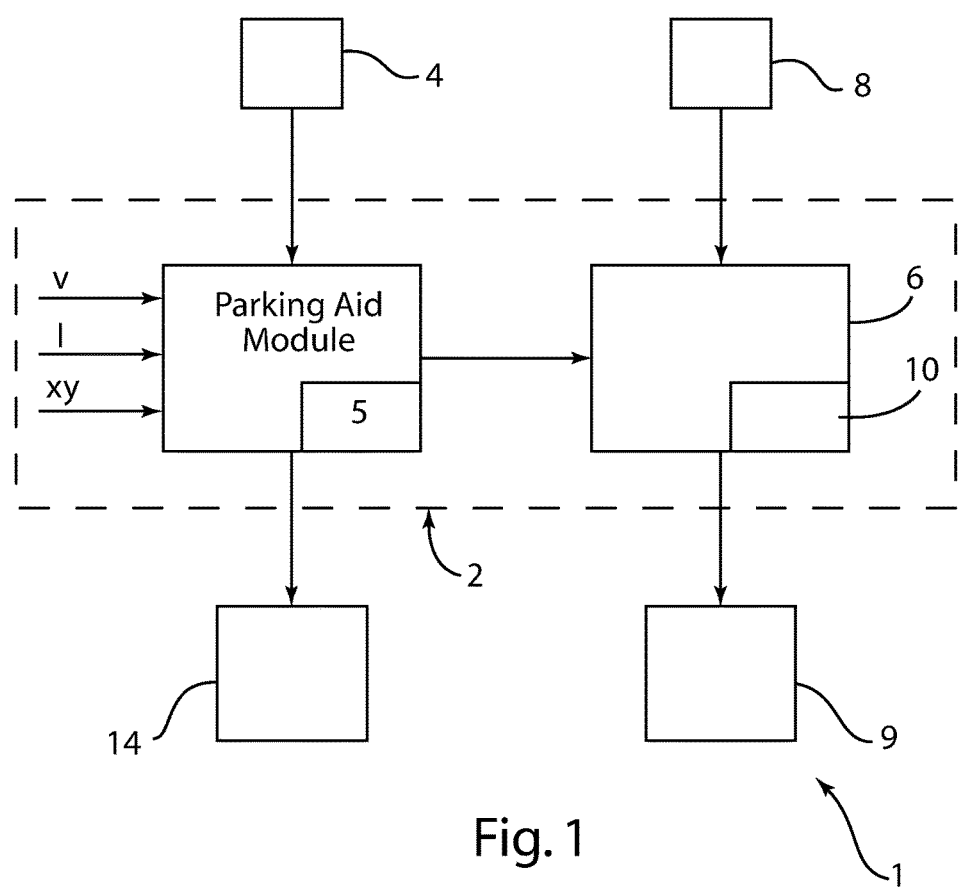
FIG. 1 is a schematic view of a steering system for an assisted parking procedure for use with a vehicle according to the invention.

FIG. 1 schematically illustrates a steering system 1 of a motor vehicle according to one example of the present invention. The steering system 1 includes a controller 2 for an assisted parking procedure used with a vehicle, such as a car. The assisted parking procedure includes entering and leaving a parking space in the forward and reverse direction relative to the direction of travel; and may include a parallel or perpendicular street parking process.

A Parking Aid Module (PAM) 3 receives, for example, vehicle side sensor and other information relating to a parking space or a parking location. This information may include, for example, vehicle velocity (v), the length of the parking space (l), and the position/location (xy) thereof. Furthermore, vehicle front and/or rear sensors on the vehicle 4 provide information relating to other vehicles or obstacles, including the distance between the other vehicles or obstacles and the vehicle 4.

The PAM 3 has a calculating unit 5 to determine the route calculation of the assisted parking procedure and to set an upper speed limit for this assisted parking procedure. The calculations are based on the above and/or additional information.

A speed reducer 6 is connected to and receives information from the PAM 3 and correspondingly limits the upper speed limit of the vehicle 4. The speed reducer or limiter 6 maintains speed of the vehicle during parking process at a speed that is less than or equal to the upper speed limit. For this, the path calculation, and/or the calculated steering angle 3 on the PAM can be consulted.

The speed reducer 6 limits the speed of the vehicle to a predetermined value, irrespective of actuation and a corresponding change changes in the position/deflection of the vehicle acceleration pedal 8. The speed reducer 6 includes a limiter 10 for suppressing driver input, via the acceleration pedal 8, that would require an increase in the vehicle's acceleration or speed if it would result in acceleration or speed greater than or equal to the upper limit. Basically, it decouples the accelerator pedal input from the actual acceleration/velocity of the vehicle, if the velocity/speed exceeds the predetermined value. Accordingly, below the defined limit the engine power and respectively the velocity/speed of the vehicle are still variable and follow the accelerator pedal 8 position.

The computing unit 5 and the limiter unit 10 may also be arranged in other structures, so the arrangement of the two units can be reversed.

Figure 2:
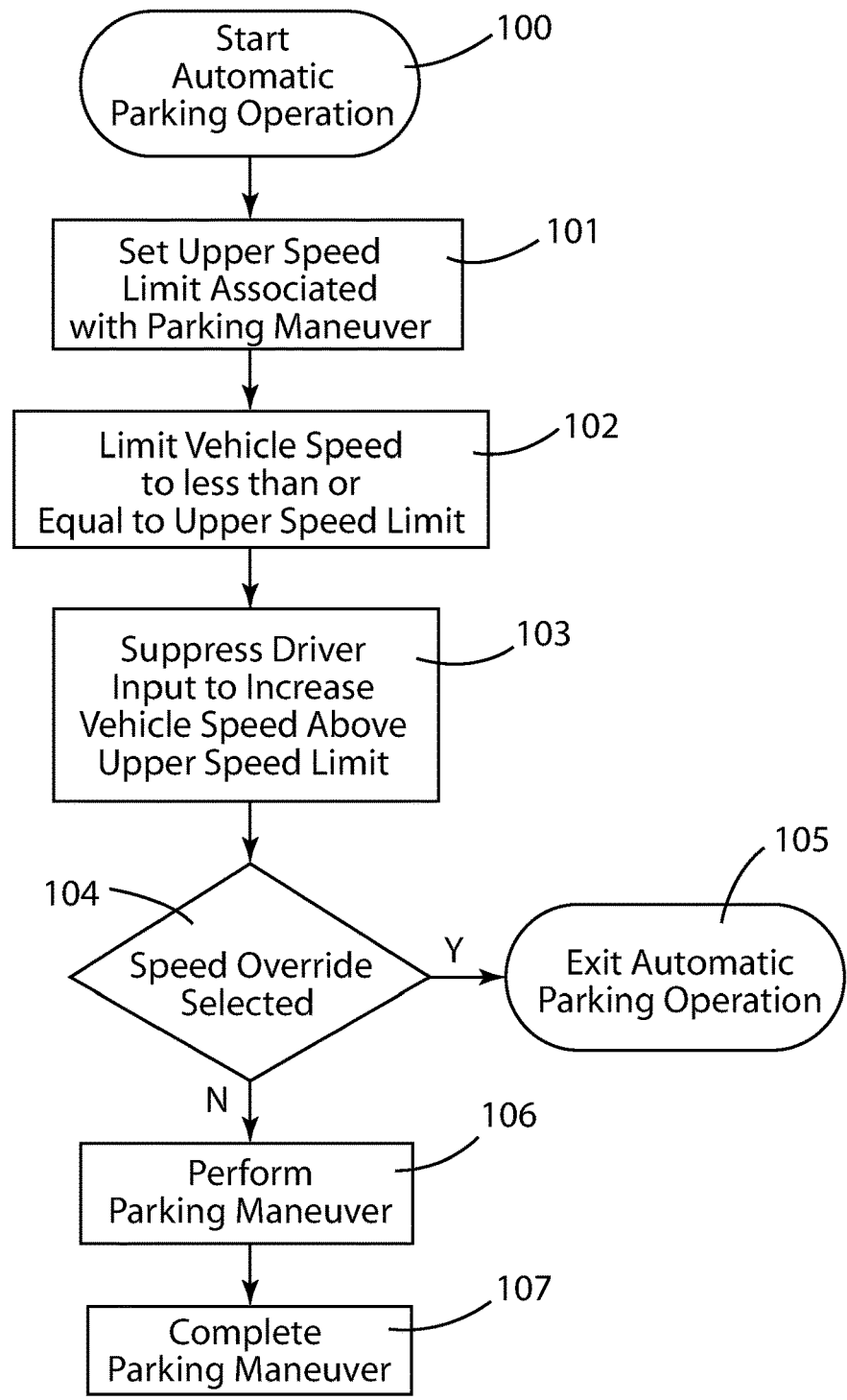
FIG. 2 is a flowchart of a method for controlling an assisted parking procedure of a vehicle according to the invention.

With reference to FIG. 2, the method for controlling an assisted parking procedure of a vehicle will be described. Block or step 100 indicates the start of the procedure. For example, after a suitable parking space has been identified the PAM 3 and side sensors determine and independently control a suitable path or trajectory of the vehicle 4; that is, independent of the driver.

Block or step 101 sets an upper speed limit typically in a range of 5 to 15 km/h, generally 10 km/h. Thus, excessive speed cancels or prevents the parking function. Regardless of the position of the accelerator pedal 8, the upper speed limit or top speed occurring during a parking maneuver cannot be exceeded, unless a special override function is activated.

Block or step 102 illustrates the speed reducer or speed limiter 6 limiting the parking speed to less than or equal to the upper speed limit.

Block or step 103 illustrates suppression of any increase of the vehicle's speed by a driver of the vehicle that exceeds the upper speed limit. Specifically, a change in the position of the accelerator pedal 8 does not change the position of the control or throttle valve so that the power of the engine 9 is not increased. Below the upper limit speed, the engine power and thus the speed of the vehicle is controlled by and follows the position of the accelerator pedal 8.

Additionally or alternatively, the brake 14 may be used to limit the speed. For example, a short braking pulse is added, when the vehicle approaches the upper speed limit. This autonomous braking pulse reduces the possibility of a collision during the parking process due to increased speed and also reminds the driver that the parking process is controlled by the PAM.

Block or step 104 illustrates the step of monitoring an override function. Block or step 105 illustrates that engagement or activation of the override function results in the system exiting the automatic or autonomous parking operation. If the override function is not engaged, the process proceeds to block or step 106. One example of an override function is based on activation or additional pressure on the accelerator by the vehicle operator such that it exceeds a predetermined or default value. The default value is selected as a function of the slope at the location of the automobile and selected in the direction of travel of the motor vehicle.

To prevent a sudden increase in speed at the moment of the override, the acceleration is preferably incrementally raised or elevated to avoid possible accidents due to strong, sudden acceleration. One method for implementing a smooth acceleration includes implementation of a suitable lowpass filter. The same gentle behavior should be present for the moment when the vehicle is at the upper speed limit and the parking function is terminated, for example by pressing a cancel button or by influence of the driver on the steering wheel.

In order to prevent undesired termination of the parking function due to excessive pressing or deflection of the accelerator pedal on large gradients, the percentage override limit depends upon the pitch at which the vehicle is positioned. The greater the slope, the higher override limit.

Block or step 106 illustrates the assisted parking procedure performed fully automatically or semi-automatically at suitable parking speeds.

Figure 3:
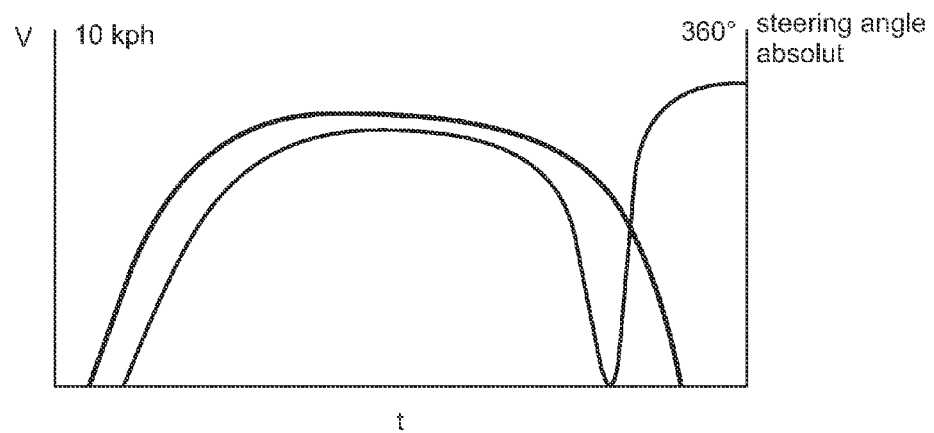
FIG. 3 is a vehicle velocity, steering angle graph of a typical parallel parking maneuver.

FIG. 3 is a representation of parallel parking behavior that will now be considered. FIG. 3 shows the trajectory or the absolute steering angle against time for parking maneuvers. As shown, the speed increases and decreases slowly, respectively, while a steering angle change of direction takes place.

Figure 4:
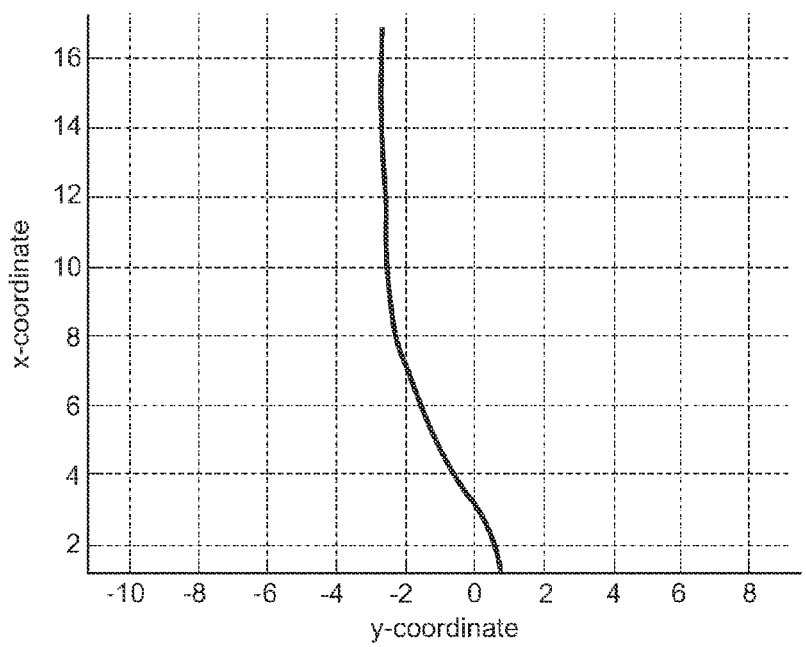
FIG. 4 is a plot of reversing speed versus X and Y coordinates of a typical parallel parking maneuver.

Another possibility of representation is shown in FIG. 4. Here, the parking locus is represented by x and y coordinates.

Figure 5:
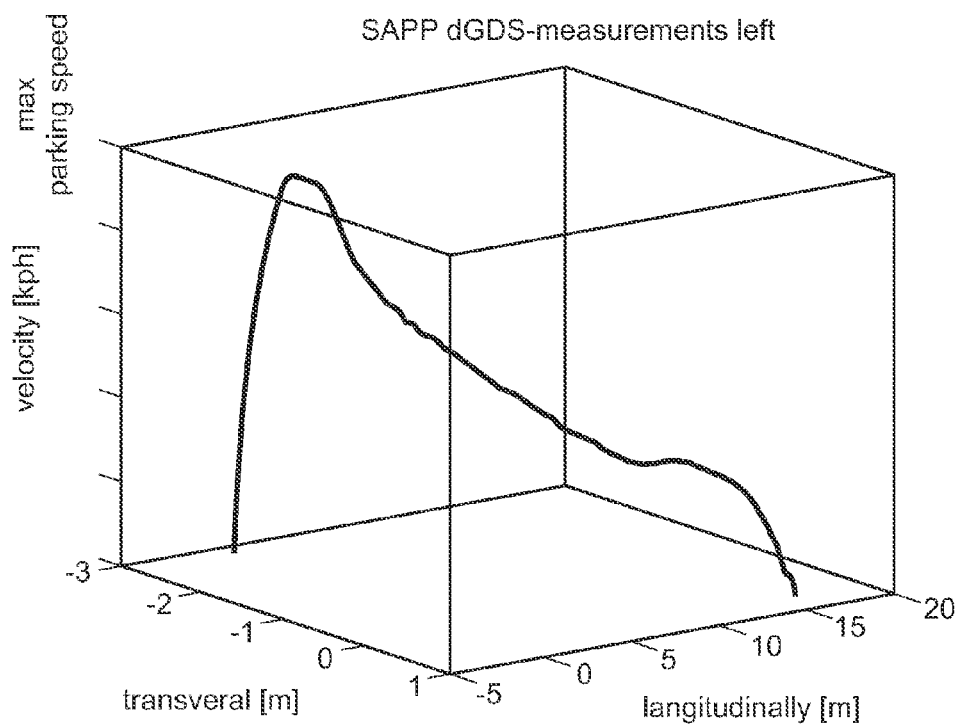
FIG. 5 is a 3-dimensional diagram of a typical parallel parking maneuver.
Figure 6:
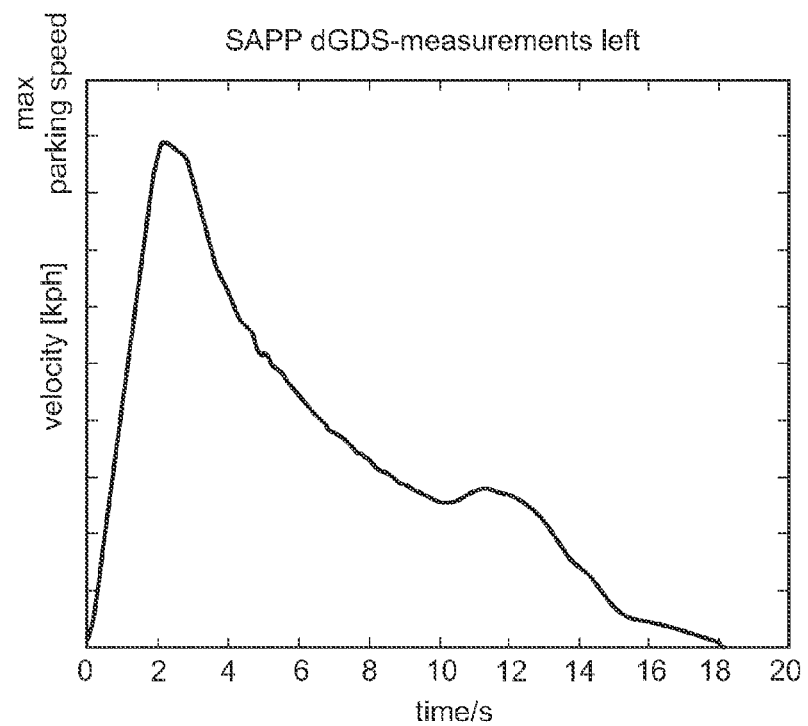
FIG. 6 is a velocity versus time diagram of a typical parallel parking maneuver.

FIG. 5 shows a further Illustration, this time in three dimensions, wherein the reverse speed is plotted against the x and y or lateral and longitudinal coordinates. Thus, the trajectory of the parking operation is illustrated. FIG. 6 shows the velocity plotted against the time of the parking process.

There is a connection between the steering angle or the trajectory and speed of the vehicle. A parallel parking maneuver or a parking process consists of several individual steps:

Before starting the parking process, the vehicle is placed on parallel alignment to the parked vehicle, and with a straight steering angle (0°). This is followed by accelerating and reversing straight towards the parking space. And then increasing the steering angle at a constant speed to maneuver the rear end of the vehicle into the parking space. The steering angle exceeding by more than 360°.

Steady reduction in the steering angle coincides with the speed reduction, to maneuver the front of the vehicle into the parking space. The orientation or position of the vehicle in the parking space is now diagonal. Upon reaching a steering angle of 0°, continued rotation of the steering wheel results in a negative angle and the vehicle speed is further reduced. The vehicle is now aligned, and the parking maneuver is complete. To safely stop the vehicle, it may be necessary for the driver to actuate the brake.

Particularly during the times when the direction or the sign of the steering angle or the rotation of the steering wheel changes, the result is a reduction in the speed. Based on this finding, the steering angle or the trajectory of the vehicle is used as can be used as time equivalent or position variable input.

Several examples or possibilities for implementing a predefined speed profile or a dynamic speed limitation include an adjustable speed limitation device or variable speed; predefined braking interventions as a function of ultrasonic sensors to simulate a behavior shown in FIGS. 5 and 6; or use of a combination of speed limit and braking interventions especially for low speeds less than 5 km/h.

Using additional sensors or ultrasonic sensors enables the system to be responsive to unstable or unsteady situations where, for example, an obstacle suddenly appears in the parking space.

Block or step 107 illustrates completion of the assisted parking maneuver. In this case, at the end of the parking process, the speed of the vehicle continually reduces to a hold point, wherein the hold point of the vehicle is based on the output of the distance sensors and/or a route description, calculating the parking process is determined at the park aid module and the module knows the position of the vehicle and the path of vehicle travel. The distance-to-travel calculated from planned trajectory and current vehicle position offers another way of doing this. Also, the parking operation can be completed by a driver's braking action.

As indicated above, two ways to end a parking maneuver include using distance information, for example provided by ultrasonic sensors 4; and having information about the distance to be traveled or distance-to-travel, provided by the PAM 3 available. In particular, during lateral approach of the vehicle front, the speed between the vehicle and a parked vehicle is small enough to be measured with conventional ultrasonic sensors. As the distance between the two vehicles reduces the speed can be adjusted to give the driver a feeling of safety to the environment and the entire parking process.

Another issue is the approaching of the host vehicle's rear end to the rearward parked vehicle and respectively completing the parking maneuver. This situation can sometimes cause a collision because the driver might underestimate the remaining distance between the two vehicles or the approaching speed is too high.

Accordingly, a fusion of both types of information can make the system more reliable. As set forth above, these signals can be used as input for the speed limiter 6 to control the velocity and ramp it down to 0 km/h in a smooth and comfortable way. Besides using a speed limitation to bring the vehicle to a stop, the brakes can be applied. Different from an emergency braking, the purpose in this case is to use the brakes to achieve a comfort braking.

As the distance decreases, the brake pressure increases to decelerate the vehicle. At the end, when the vehicle is almost in its final desired parking position, the pressure drops or decreases to make a smooth and jerk-free stop possible.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling an assisted parking procedure of a vehicle comprising the steps of:
    setting an upper speed limit;
    limiting the vehicle speed during the assisted parking procedure to less than or equal to the upper speed limit;
    decoupling driver accelerator pedal actuation input signal based on pedal movement from the vehicle speed when said signal operates to increase vehicle speed above the upper speed limit; and
    terminating driver accelerator pedal actuation input suppression when driver accelerator pedal actuation input exceeds a predetermined value wherein the predetermined value depends on vehicle slope.

2. A method as set forth in claim 1 including using a speed limiting device to limit vehicle speed during the assisted parking procedure.

3. A method as set forth in claim 1 wherein the step of limiting vehicle speed includes limiting the output of an engine of the vehicle.

4. A method as set forth in claim 1 wherein the step of limiting vehicle speed includes using the brakes of the vehicle.

5. A method as set forth in claim 1 including the step of selecting a first predetermined value based on a first slope value and a second predetermined value based on a second slope value with the second predetermined value greater than the first predetermined value.

6. A method as set forth in claim 1 wherein the predetermined value is selected from a predetermined value linear gradient.

7. A method as set forth in claim 1 including the step of at the end of parking process continuously reducing the speed of the vehicle to reach a vehicle hold point, the hold point of the vehicle determined by distance sensors or a route calculation of the parking operation.

8. A steering system for a vehicle having an assisted parking operation comprising:
    a speed limiting device, said speed limiting device operative to maintain speed at a speed less than or equal to an upper speed limit; and
    a control unit, said control unit operative to suppress a signal from an accelerator pedal that would require an increase in speed in excess of upper speed limit and to cease suppressing said increase when an accelerator pedal actuation input exceeds a predetermined limit.

9. A steering system as set forth in claim 8 including said control unit operative to limit the output of an engine of the vehicle to limit the vehicle speed.

10. A steering system as set forth in claim 8 including said control unit operative to control a vehicle brake to limit the vehicle speed.

11. A steering system as set forth in claim 8 including a plurality of sensors, said sensors cooperating with said control unit to control the vehicle speed.

12. A method of controlling an assisted parking procedure of a vehicle comprising the steps of:
    setting an upper speed limit associated with the assisted parking procedure;
    limiting the speed of the vehicle speed during the assisted parking procedure to a parking speed less than or equal to the upper speed limit speed;
    suppressing accelerator pedal actuation input such that a change in the position of the accelerator pedal does not change engine power and correspondingly vehicle speed when said accelerator pedal actuation input requires an increase in vehicle speed greater than said upper speed limit;
    providing an override function operative to exit the assisted parking procedure and end accelerator pedal actuation input suppression; and
    engaging said override function when the accelerator pedal actuation input exceeds a predetermined value wherein the predetermined value depends on vehicle slope.

13. A method as set forth in claim 12 including the step of incrementally raising vehicle speed at the moment of the override to reduce sudden acceleration.

14. A method as set forth in claim 12 including the step of selecting a first predetermined value based on a first slope value and a second predetermined value based on a second slope value with the second predetermined value greater than the first predetermined value.

15. A method as set forth in claim 12 wherein the predetermined value is selected from a predetermined value linear gradient.

* * * * *